(12) United States Patent
Tolson

(10) Patent No.: US 11,477,063 B2
(45) Date of Patent: Oct. 18, 2022

(54) DEVICE AND METHOD FOR MODULATING INFORMATION

(71) Applicant: THE SECRETARY OF STATE FOR FOREIGN AND COMMONWEALTH AFFAIRS, London (GB)

(72) Inventor: Nigel James Tolson, London (GB)

(73) Assignee: The Secretary of State for Foreign and Commonwealth Affairs, London (GB)

( * ) Notice: Subject to any disclaimer, the term of this patent is extended or adjusted under 35 U.S.C. 154(b) by 0 days.

(21) Appl. No.: 17/291,245

(22) PCT Filed: Nov. 5, 2019

(86) PCT No.: PCT/GB2019/000155
§ 371 (c)(1),
(2) Date: May 4, 2021

(87) PCT Pub. No.: WO2020/095015
PCT Pub. Date: May 14, 2020

(65) Prior Publication Data
US 2021/0392020 A1    Dec. 16, 2021

(30) Foreign Application Priority Data
Nov. 6, 2018    (GB) ..................... 1818076

(51) Int. Cl.
*H04L 5/12*    (2006.01)
*H04L 23/02*    (2006.01)
(Continued)

(52) U.S. Cl.
CPC .......... *H04L 27/183* (2013.01); *H04L 27/227* (2013.01); *H04L 27/3488* (2013.01);
(Continued)

(58) Field of Classification Search
CPC . H04L 27/183; H04L 27/227; H04L 27/3488; H04L 27/366; H04L 27/3818; H04L 27/3411; H04L 27/3444
(Continued)

(56) References Cited

U.S. PATENT DOCUMENTS

2007/0066268 A1* 3/2007 Simic ................... G01S 19/235
455/318
2009/0042511 A1* 2/2009 Malladi ................. H04L 5/023
455/62

FOREIGN PATENT DOCUMENTS

EP    1301001 A2    4/2003
EP    1583271 A2    10/2005
(Continued)

OTHER PUBLICATIONS

United Kingdom Patent Application No. GB1818076.0, Search Report dated Mar. 21, 2019, 4 pages.
(Continued)

*Primary Examiner* — Tanmay K Shah
(74) *Attorney, Agent, or Firm* — Kilpatrick Townsend & Stockton LLP

(57) ABSTRACT

A method of signal communication is disclosed comprising providing source data having a predetermined signal power; mapping the source data onto a first modulation scheme to obtain a first set of complex symbols; mapping the source data onto at least one further modulation scheme to obtain at least one further set of complex symbols; combining the first set of complex symbols and the at least one further set of complex signals to form a modulated signal to be forwarded along a communications channel. Beneficially, the predetermined signal power of the source data is split between the first modulation scheme and the at least one further modulation scheme.

17 Claims, 15 Drawing Sheets

(51) Int. Cl.
*H04L 27/18* (2006.01)
*H04L 27/227* (2006.01)
*H04L 27/34* (2006.01)
*H04L 27/36* (2006.01)
*H04L 27/38* (2006.01)

(52) U.S. Cl.
CPC ........ *H04L 27/366* (2013.01); *H04L 27/3818* (2013.01); *H04L 27/3411* (2013.01); *H04L 27/3444* (2013.01)

(58) Field of Classification Search
USPC .......................................................... 375/262
See application file for complete search history.

(56) References Cited

FOREIGN PATENT DOCUMENTS

| | | | |
|---|---|---|---|
| EP | 2244407 | A2 | 10/2010 |
| EP | 3297240 | A1 | 3/2018 |
| WO | 200251031 | A1 | 6/2002 |
| WO | 2004034666 | A1 | 4/2004 |
| WO | 2006122293 | A2 | 11/2006 |
| WO | 2008154506 | A1 | 12/2008 |

OTHER PUBLICATIONS

International Patent Application No. PCT/GB2019/000155, International Search Report and Written Opinion dated May 19, 2020, 23 pages.
United Kingdom Patent Application No. GB1916065.4, Examination Report dated Apr. 29, 2021, 3 pages.
United Kingdom Patent Application No. GB1916065.4, Examination Report dated Nov. 11, 2021, 4 pages.
United Kingdom Patent Application No. GB1916065.4, Search and Examination Report dated Apr. 1, 2020.

\* cited by examiner

DEVICE AND METHOD FOR MODULATING INFORMATION

The invention is in relation to signal modulation in the communications field, particularly for use in high Doppler environments such as satellite communication and navigation systems. The signal modulation method and device may also be used in Internet of Things (IOT) applications.

All commercial high performance wireless communications systems such as Wi-Fi IEEE 802.11n/ac or 4G mobile use Phase Shift Keying (M-PSK) and Quadrature Amplitude Modulation (M-QAM) to achieve good spectral efficiency. Typically the number of unique symbol positions representing the modulation M, is controlled dynamically according to the received signal to noise ratio (SNR) and would be in the range 4 to 64 i.e. QPSK to 64-QAM respectively.

Unfortunately, all these modulation schemes contain lines of rotational symmetry in their in-phase and quadrature phase (IQ) constellations which give rise to de-rotation uncertainty for the phase in the demodulator. This phase uncertainty can be resolved by framing the data and including in the frame known synchronisation symbols (or pilot symbols) which when received can be used to position the constellation to the correct phase orientation for successful demodulation. The inclusion of known synchronisation symbols reduces the spectral efficiency of the data link and the data link must be punctuated with synchronisation data at such a rate so as to satisfy the coherence time of the channel.

Alternatively, an unmodulated parallel orthogonal spreading code or pilot code, can be summed to a modulated spreading code (payload) so that continuous de-rotation of the payload code can be provided by the pilot code. Such a method is employed in recent GNSS standards such as GPS and GALILEO.

When implementing Phase Shift Keying modulation the requirement to synchronise in frequency and phase usually requires the use of complicated and costly receivers and transmitters.

Therefore, embodiments of the present invention are intended to address at least some of the above described problems and desires. In particular there is a need to provide a modulation technique that better optimises the information throughput, utilises low cost equipment and offers reliable signal to noise ratios, which is applicable to single and multicarrier arrangements.

Accordingly, there is provided a method of signal communication implemented at a transmitter end of a communication network comprising:
a. providing source data having a predetermined signal power;
b. mapping the source data onto a first modulation scheme to obtain a first set of complex symbols;
c. mapping the source data onto at least one further modulation scheme to obtain at least one further set of complex symbols;
d. combining the first set of complex symbols and the at least one further set of complex signals to form a modulated signal to be forwarded along a communications channel, wherein the predetermined signal power of the source data is split between the first modulation scheme and the at least one further modulation scheme.

Beneficially the modulated signal may be forwarded along a communications channel via the transmitter.

"Providing" means either synthesising the source data, generating the source data or otherwise obtaining the source data. The source data may be discrete source data which may be provided at the site of the transmitter end of the communication network, or may be forwarded to the transmitter end of the communication network from a remote location. The discrete source data is original source information that has been quantised and is not an analogue input.

Whilst the majority of the method steps must be performed in sequential order, the steps b and c may be applied simultaneously as parallel steps. The 'combining step' may be a summing step.

The first modulation scheme may be represented by a first constellation diagram and the at least one further modulation scheme may be represented by at least one further constellation diagram, wherein the first modulation scheme and the at least one further modulation scheme may be selected such that the angle between a selected symbol in the first constellation diagram and any symbol in the at least one further constellation diagram is unique. This ensures that each of the original source symbols can be represented by a unique differential angle.

Preferably, the modulation order of the first modulation scheme may differ to the modulation order of the at least one further modulation scheme.

The modulation order of the first modulation scheme may be of an odd value and the modulation order of the at least one further modulation scheme may also be of an odd value. This is because the use of two odd schemes ensures the technique is suited to digital applications i.e. together they form 'power of two' symbols e.g. 8-PSK.

The first modulation scheme and the at least one further modulation scheme may be a Phase Shift Keying modulation scheme.

The constellation of the first Phase Shift Keying modulation scheme and the at least one further Phase Shift Keying modulation scheme may be asymmetric. This once again ensures that the differential angle between the two schemes is unique.

The first Phase Shift Keying modulation scheme may be a 3-Phase Shift Keying (3-PSK) modulation scheme and the at least one further Phase Shift Keying modulation scheme may be a 5-Phase Shift Keying (5-PSK) modulation scheme.

More of the predetermined signal power may be provided to the 5-PSK scheme compared to the 3 PSK. This is to normalise the Signal to Noise of the two schemes which is of benefit to the technique.

The allocation of power to the 5-PSK and the 3-PSK may be optimised for BER performance, for example a gain of 1.6 can be provided to the 5-PSK processing arm.

The first complex symbols and further complex symbols may be modulated in phase and amplitude. Specifically, the symbol may be made of 4 bits, whereby the first three bits control the phase and the $4^{th}$ bit controls the amplitude. However other arrangements may be implemented as desired.

The first modulation scheme may be a 6-Quadrature Amplitude Modulation (6-QAM) and the at least one further modulation scheme may be a 10-Quadrature Amplitude Modulation (10-QAM). This provides an overall 16-QAM arrangement, which is known to be better suited to more advanced telecommunications applications.

Alternatively, the first modulation scheme may be of an odd value and the second modulation scheme may be of an even value. For example, the first scheme may be 3-PSK and the second scheme may be QPSK. Or alternatively the first modulation scheme may be 3-PSK and the second modulation scheme may be BPSK.

The method may further comprise mapping the first complex symbol to a first angle and mapping the further complex symbol to a further angle.

Preferably, the method comprises maximising the standard deviation of the differential angle between the first angle and the further angle.

The first complex symbols and the at least further complex symbols may be spread by a first and second orthogonal spreading code respectively prior to combining the symbols e.g. summing the symbols.

The spreading codes may comprise a spreading factor of 2. In fact the spreading factor should be at least 2.

For a spreading code of two, the first and second orthogonal spreading codes may be Walsh codes. Whilst the spreading factor of 2 requires the Walsh codes to be applied, in the case that the spreading factor is greater than 2, another form of code may be required.

Any of the above-mentioned steps of the method may be implemented in a single carrier arrangement or in a multi-carrier arrangement.

In a further embodiment of the invention there is provided a method of signal communication implemented at the receiver end of a communication network comprising:

receiving a modulated signal comprising a set of complex symbols and a further set of complex symbols;

measuring the phase angle of the first set of complex symbols;

measuring the phase angle of the further set of complex symbols; and determining the source data in dependence upon the phase angle of the first set of complex symbols and the phase angle of the further set of complex symbols.

Preferably the method comprises determining the angular difference between the first set of complex symbols and the further set of complex symbols and subsequently determining the source data in dependence upon the angular difference.

The source data may be the original discrete data that was provided at the transmitter end of the communications network. "Determine" may mean estimate the original source data which comprises the original source information.

The further method may comprise de-spreading the first set of complex symbols and the at least one further set of complex symbols prior to determining the phase angle of the first set of complex symbols and the phase angle of the further set of complex symbols. Alternatively, the de-spreading function may be applied prior to determining the angular difference between the first set of complex symbols and the further set of complex symbols.

The further method may comprise determining the source data in dependence upon the phase angle of the first set of complex symbols and the further set of complex symbols respectively using a Look Up Table (LUT) or library.

Any of the above-mentioned steps of the further method may be implemented in a single carrier arrangement or in a multicarrier arrangement.

In a further embodiment of the invention there is provided a communications device comprising a transmitter, processor and a memory, wherein the memory stores instructions that, when executed cause the processor to:

provide source data of a predetermined signal power;

map the source data onto a first modulation scheme to obtain a first set of complex symbols;

map the source data onto at least one further modulation scheme to obtain at least one further set of complex symbols;

combine the first set of complex symbols and the at least one further set of complex signals to form a modulated signal to be forwarded along a communications channel;

wherein the predetermined signal power of the source data is split between the first modulation scheme and the at least one further modulation scheme.

The transmitter may forward the modulated signal along the communications channel.

The communications channel may take many forms and may include, but is not limited to, RF communications, fiber communications, wireless communications or cables. It may also include digital communications or even underwater acoustic communications e.g. for autonomous vehicles.

The source data may be discrete source data i.e. is digitised and is not an analogue signal.

The device may further comprise a first and at least one further code generator for generating and applying a Walsh code to the first and at least one further complex symbols prior to the combining step e.g. summing step.

The device may further comprise a gain module for allocating a larger proportion of the predetermined signal power to the first modulation scheme than to the second modulation scheme. The gain to be provided to the 5-PSK modulation scheme may be 1.6.

In an alternative embodiment of the invention, there is provided a communications device comprising a receiver, processor and a memory, wherein the memory stores instructions that, when executed cause the processor to:

receive a modulated signal comprising a set of complex symbols and a further set of complex symbols;

measure the phase angle of the first set of complex symbols;

measure the phase angle of the further set of complex symbols; and determine the source data in dependence upon the phase angle of the first set of complex symbols and the phase angle of the further set of complex symbols.

Preferably, the method may further comprise determining the angular difference between the first set of complex symbols and the further set of complex symbols and determining the source data in dependence upon the angular difference.

A communications assembly may comprise the communications device having a transmitter and a communications device having a receiver as described above, further comprising a wireless communications channel positioned therebetween.

A communications assembly may be provided with multiple communication devices and multiple communications channels configured to enable multicarrier modulation.

Whilst the invention has been described above it extends to any inventive combination of the features set out above, or in the following description, drawings or claims. For example, any features described in relation to any one aspect of the invention is understood to be disclosed also in relation to any other aspect of the invention.

The invention will now be described, by way of example only, with reference to the accompanying drawings, in which:—

In the Figures like elements are denoted by like reference numerals. The skilled reader will appreciate how complex the implementation of the method is, and thus the number of the optional features present, will be driven by the user requirements.

Figure 1:
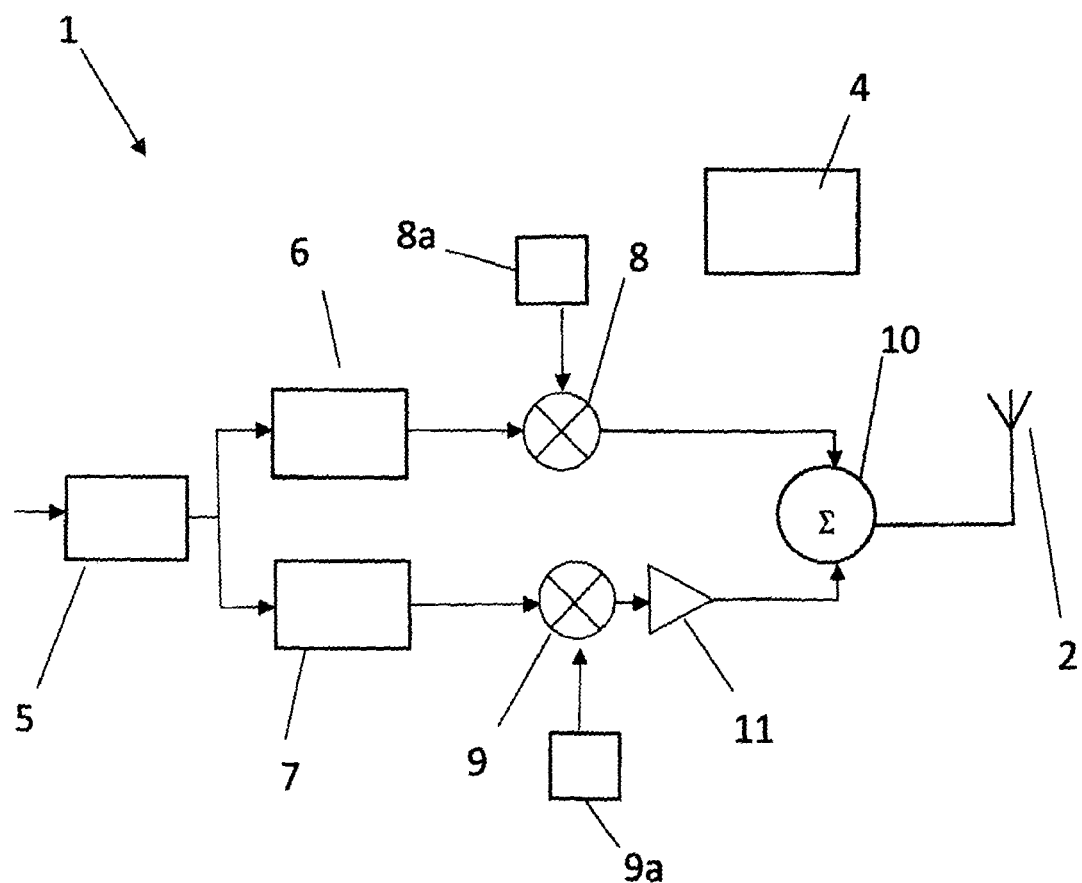
FIG. 1 is a schematic of the transmitter end of a communications device according to the invention.
Figure 2:
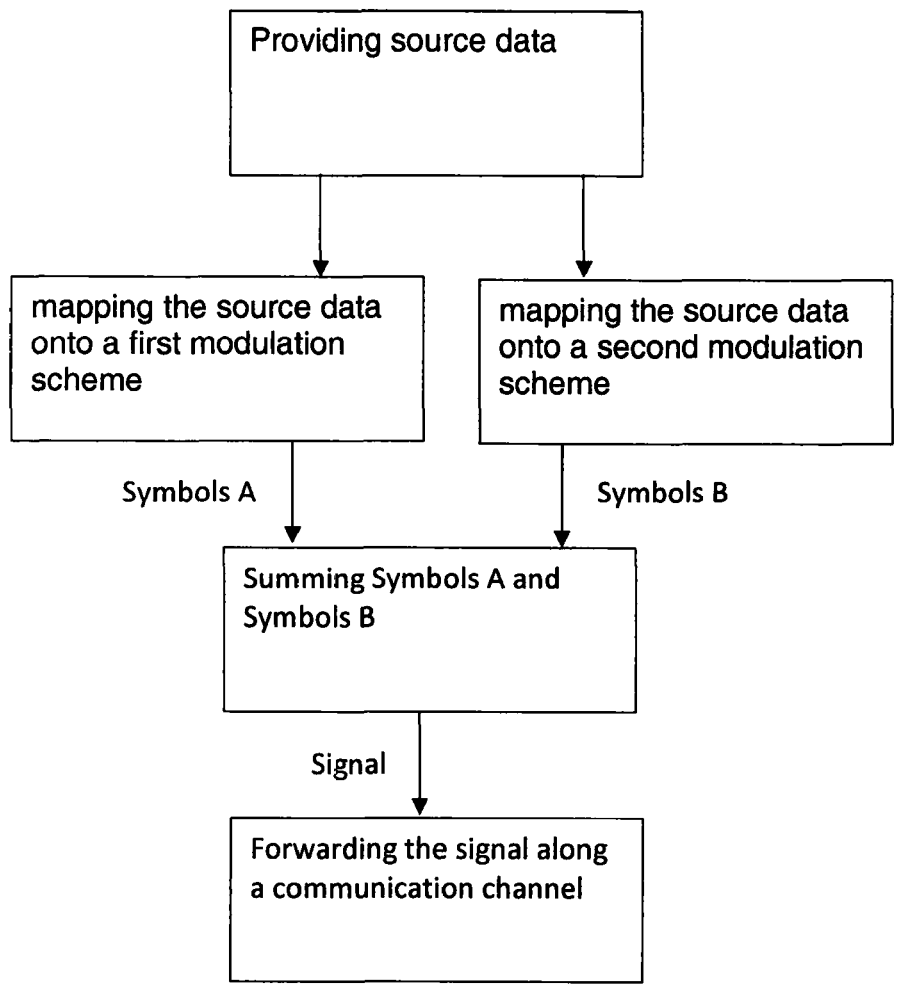
FIG. 2 shows a flow diagram of the method according to the invention at the transmitter end of the communications device.

Referring to FIG. 1, there is shown a transmitter block 1 (i.e. the transmitter end of a communications device) comprising a transmitter 2, processor and a memory 4. The memory 4 stores instructions that, when executed causes the processor to carry out a number of method steps as shown in FIG. 2, including:
a. providing a source signal where the discrete bits are provided by source information, these bits are grouped into symbols. For example, 3 bits form one symbol giving 8 symbol options 0:7;
b. mapping the discrete source signal onto a first modulation scheme to obtain a first set of complex symbols A;
c. mapping the discrete source signal onto a second modulation scheme to obtain a second set of complex symbols B;
d. summing the first set of complex symbols A and the second set of complex symbols B to form a modulated signal; and
e. forwarding the modulated signal along a communications channel.

Once the information is provided in the form of bits, the bits are converted to symbols by a converter 5. The predetermined signal power of the discrete source data is then split between the first modulation scheme via a first modulation scheme module 6 and the second modulation scheme via a second modulation scheme module 7. The modulation order of the first modulation scheme differs to the modulation order of the second modulation scheme to enable resolution of phase ambiguity due to non-identical effects on the different order modulation schemes passing along the same communications channel.

It is known for a symbol to be represented by a constellation point in a corresponding constellation diagram. The first modulation scheme and second modulation scheme are selected such that the angle between a selected symbol in the first constellation diagram and any symbol in the other constellation diagram is unique.

The modulation order of the first scheme and the at least one further modulation scheme are both of an odd number so as to create an overall 'even power of two' order modulation signal that is easily processed digitally whereby the summed M-PSK has M=2, 4, 8, 16 . . . i.e. M=$2^n$ where n=1, 2, 3 . . . .

In the first embodiment of the invention the system is simplified such that the first modulation scheme and the second modulation scheme is a Phase Shift Keying modulation scheme where the constellation points are provided in a single orbit.

In use the system has three bits [b0, b1, b2] per symbol. At the transmitter end 1 there is obtained discrete source data having a signal power of a known value or given value which is unknown i.e. the signal power can be said to be predetermined. The 8 symbols are mapped onto two separate odd modulated complex values i.e. the 3-PSK and 5-PSK schemes which are spread by using orthogonal direct sequence spreading codes for example Walsh codes generated by respective code generators 8, 9. Therefore the two pathways are produced by multiplication by the known orthogonal spreading codes which are correctly time aligned (provided by spreading function module 8 and spreading function module 9 each located on differing processing paths and the codes are provided by respective spreading code sources 8a, 9a). For this set up the minimum value of the spreading factor is 2 and the codes are {1,1} for the 5-PSK and {1,–1} for the 3-PSK. Once spread the signals are summed together using a summing module 10 whereby slightly more of the predetermined signal power is allocated to the 5-PSK signal. This is achieved by applying a gain by means of a gain amplifier 11 located in the second processing pathway at a position intermediate the spreading function module 9 in the 5-PSK processing arm and the summing module 10. This redistribution of the signal power effectively equalises the error of the 3-PSK and 5-PSK, by taking power from 3-PSK and giving it to the 5-PSK. This normalising effect is required since the 3-PSK has a lower BER performance than 5-PSK due to the angle between symbol positions (which can be represented in the IQ constellation). This is because for the 5-PSK the angles between the symbols are smaller than for the 3-PSK and therefore can't tolerate as much signal to noise due to the location of the boundary geometries.

Notably, the constellation of the first odd PSK scheme and the at least one further odd PSK scheme is asymmetric i.e. the lines of symmetry in the IQ constellations are removed.

Once summed together the final modulated signal comprising the summed 3-PSK and 5-PSK symbols is forwarded to a transmitter 2 for transmission along a communications channel (not shown).

FIG. 1 shows the base band model, however for the device to work at a carrier frequency a frequency up conversion circuit (not shown) is required to be located in the path prior to the antenna 2.

Figure 3A:
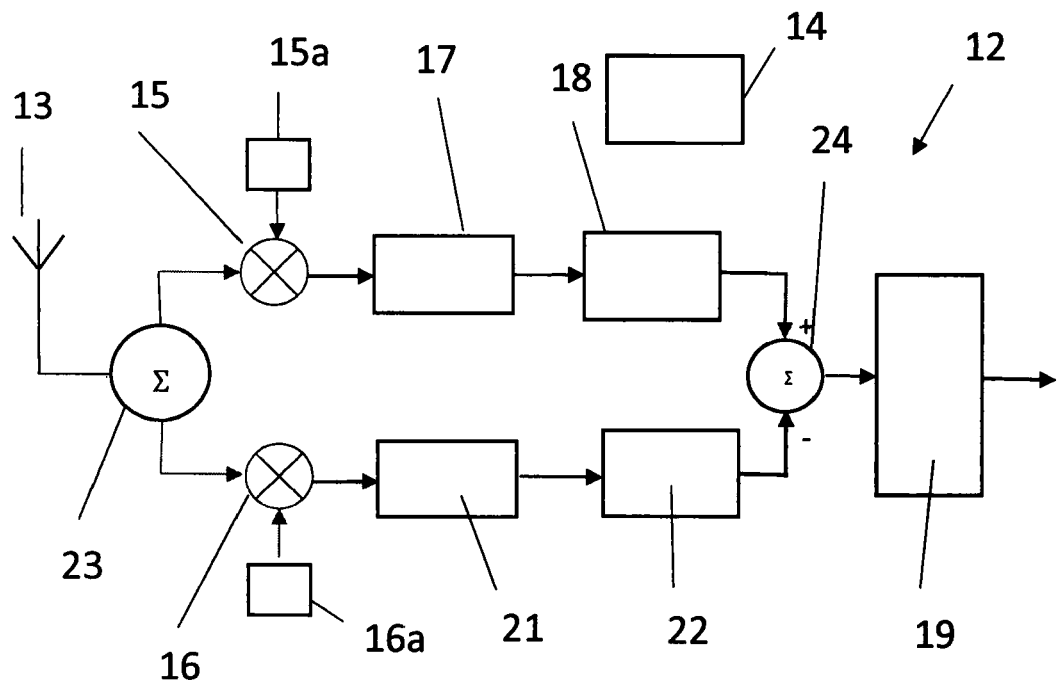
FIG. 3a shows a schematic of the receiver end of a communications device according to the invention where the difference of the angles are provided.

In FIG. 3a, there is shown a receiver block 12 (i.e. a receiver end of a communication device) which comprises a receiver 13 and a further memory 14 and processor (not shown). This further memory 14 stores instructions that when executed cause the processor to perform the method steps of FIG. 4:

receive the modulated signal which includes the first set of complex symbols and the second set of complex symbols;
measure the phase angle of the first set of complex symbols A;
measure the phase angle of the further set of complex symbols B;
determine an angular difference between the first set of complex symbols and the further set of complex symbols; and
determine discrete source data in dependence upon the differential angle.

The received signal is split into two pathways via a summing module 23 and then de-spread at the respective de-spreading function modules 15, 16 using the 0 and 1 spreading codes provided by the code source 15a, 16a. This provide the two routes of the signal. Taking the first route, the de-spread signal is then integrated over the symbol period (i.e. from 0 second to the symbol period) at the integrator 17. Then the Arc tan 2 of the complex value is taken at the Arc tan 2 circuit 18 to obtain the phase angle of the signal. The same process is performed along the second route using the integrator 21 and the Arc tan 2 circuit 22. Therefore, the phase angles of the first set of symbols and the second set of symbols are resolved separately in the receiver block 12 and in a first embodiment the difference between the phase angles for the first set of symbols and the phase angles for the second set of symbols are determined at the summing module 24.

The LUT (Look Up table) 19 with the differential angle to symbol estimated value is then implemented and the symbols are estimated at the output of the receiver block 12.

Figure 3B:
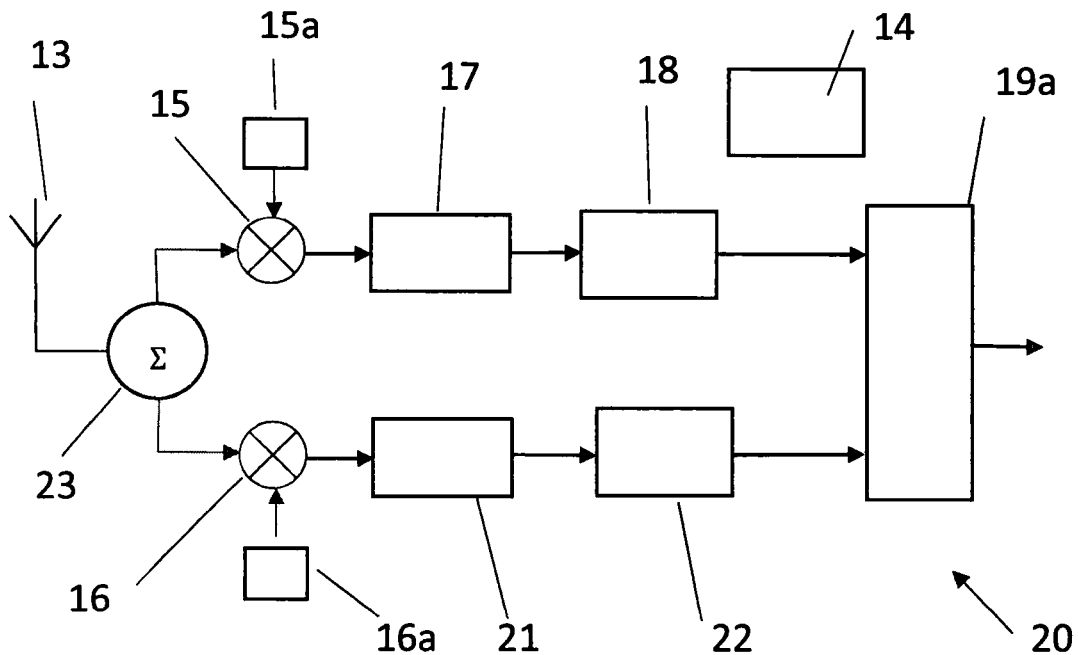
FIG. 3b shows a schematic of the receiver end of a communications device where the phase angles are provided.

FIG. 3b shows an alternative receiver block 20 of a communication device whereby the angular difference is not determined and the complex symbols are instead estimates based on the first phase angle and the second phase angle i.e. the two angles are fed directly into the look up table 19a. In this arrangement the first column in the LUT is the angle from the first branch and the second column is the angle from the second branch. The symbol is then estimated as the best fit to the LUT. Therefore, in this embodiment there is no summing module 24 required. It has been found that this direct LUT arrangement provides a better BER performance when compared to the differential angle example.

Both FIG. 3a and FIG. 3b are basic receiver blocks 12, 20 (base band model i.e. no frequency translation). Therefore, to operate at a carrier frequency, a frequency down conversion block (not shown) is required to be located in the pathway after the receiving antenna 13.

Figure 4:
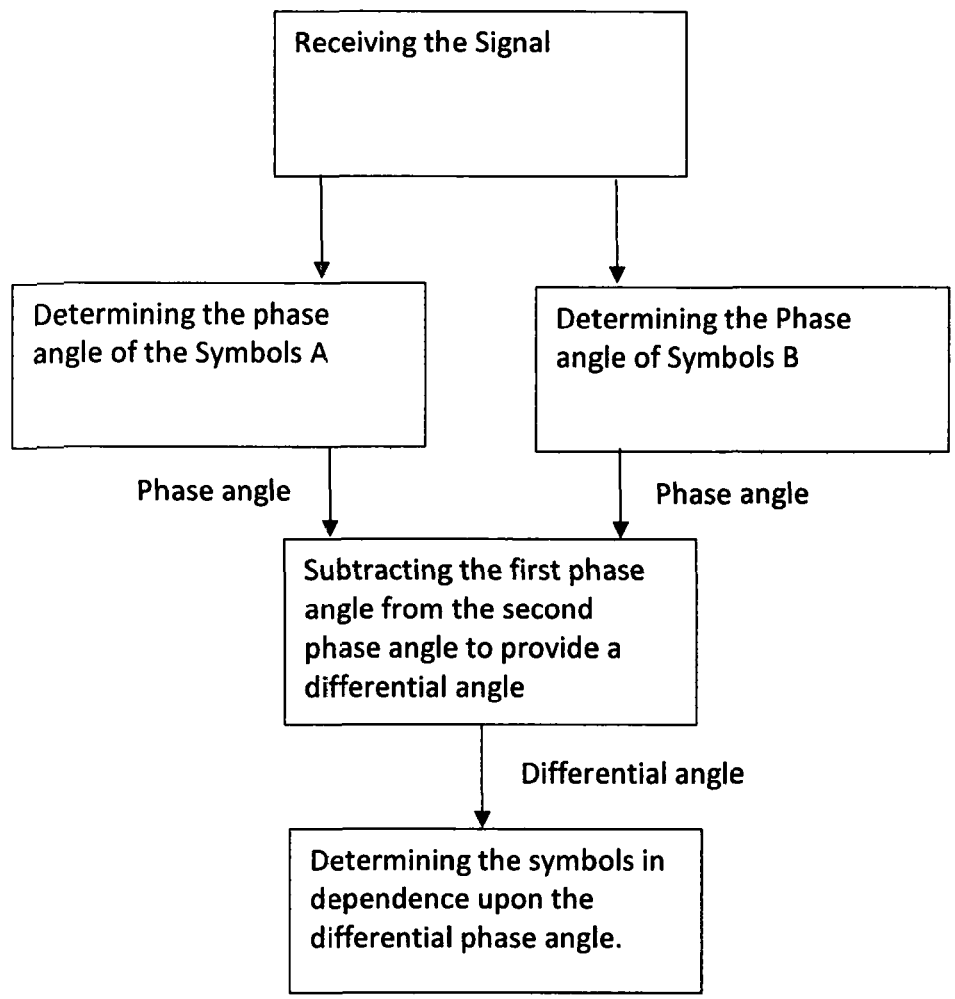
FIG. 4 shows a flow diagram of the method according to the invention at the receiver end of the communications device where the difference between the angles is provided.

As shown in FIG. 4, the receiver end correlates on the two spreading codes (de-spreads the codes) and then measures the phase of each symbol separately for both the 3-PSK and the 5-PSK when correlated at the receiver. After de-spreading, the phase angle is obtained by integrating across the symbol period and then taking the Arc tan 2 (A TAN 2) of the complex number.

The demodulator determines the symbol by jointly measuring the phase and the magnitude of the signal. By obtaining the symbol information in this way, there is no requirement for implementing a feedback loop to track the phase, making for a far more simplified system.

The difference between the phase angles for the first set of symbols and the phase angles for the second set of symbols are determined and the discrete source data is estimated in dependence upon the angular difference between the first set of complex symbols and the further set of complex symbols by using a look-up table (LUT) 19.

Figure 5:
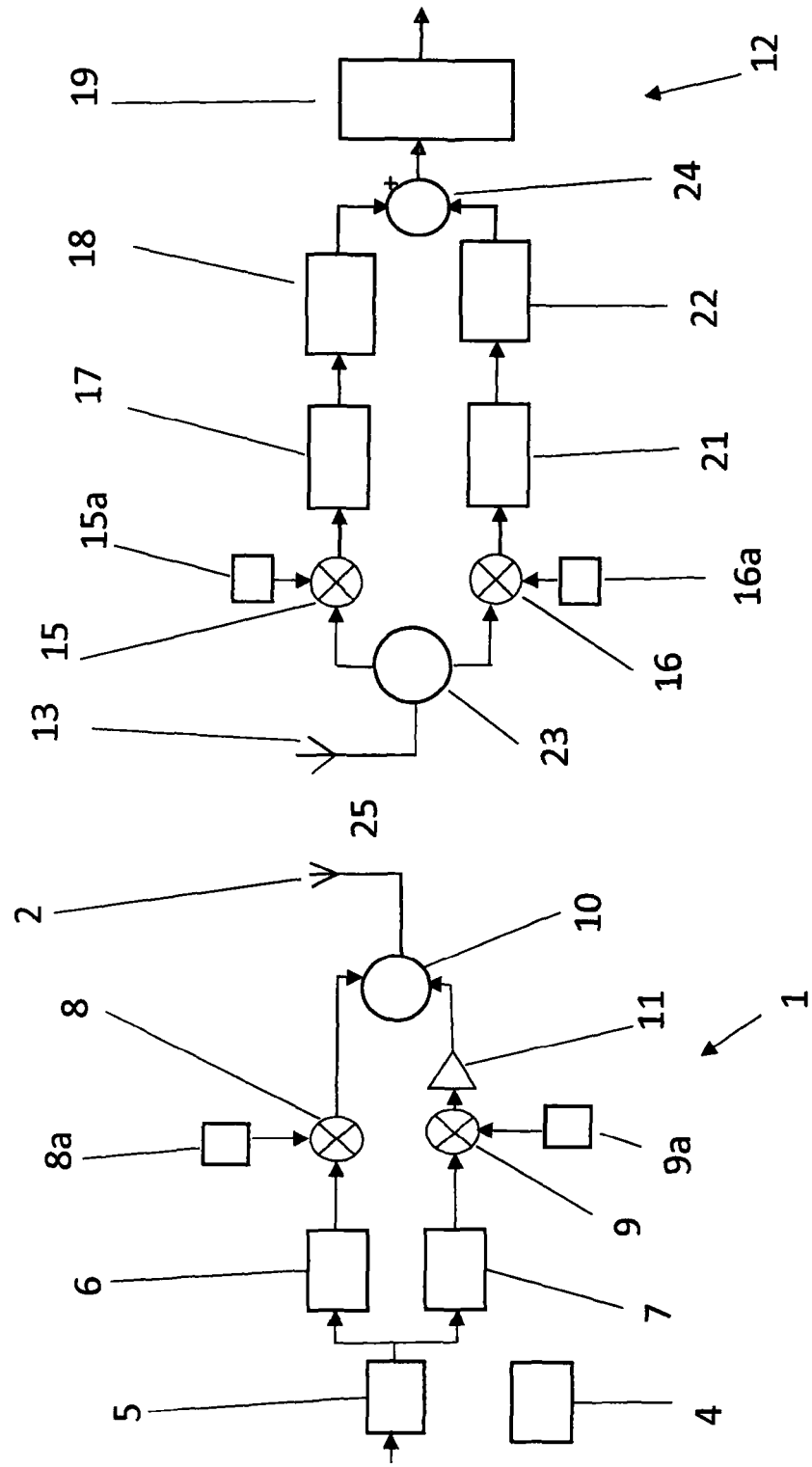
FIG. 5 shows a schematic of a single carrier communications device according to the invention.

FIG. 5 shows a device for single carrier modulation whereby the transmitter end 1 of the communications device and the receiver end 12 of the communications device are separated by a communication channel 25 of arbitrary distance or phase. The communication channel is a wireless channel. The objective of the communication device is to determine the discrete source data regardless of the arbitrary distance or phase experienced by the modulated signal. This is achieved by relying on the fact that the first set of symbols A and the second set of symbols B (which can be represented as an IQ constellation) experience the same distance or phase shift as they travel along the communication channel. By comparing the two phase angles, the distance or phase shift can be accommodated for and the original symbol information can be recovered. Therefore, by using the technique of the invention there is no requirement to use a pilot signal to aid synchronisation.

Table 1 shows that the phase difference between the first and second odd PSK modulation schemes provides a unique angle (in degrees). This unique angle gives the modulation its blind properties.

This technique relies upon the fact that the first complex symbol is mapped to a first angle and the second complex symbol is mapped to a second angle. This mapping is designed to give the maximum phase difference between symbols. Maximising the standard deviation of the resultant differential angle provides optimisation of the performance of the system. Table 1 shows symbol mapping to the 5-PSK and the 3-PSK angles in degrees using a standard deviation of 189.41. When obtained, the resultant differential angle is then compared in a Look Up Table (LUT) 19' to achieve the estimation of the original 8-PSK symbol (which is the combination of 5-PSK and 3-PSK).

TABLE 1

| Symbol | 5-PSK angle (degrees) | 3-PSK angle (degrees) | 5-PSK − 3-PSK differential angle (degrees) |
| --- | --- | --- | --- |
| 0 | 0 | 0 | 0 |
| 1 | 72 | 0 | 72 |
| 2 | 0 | 120 | −120 |
| 3 | 144 | 0 | 144 |
| 4 | 72 | 240 | −168 |
| 5 | 216 | 0 | 216 |
| 6 | 0 | 240 | −240 |
| 7 | 288 | 0 | 288 |

Since the unique angular difference between symbols has been designed to be as large as possible, noise vectors will act differently on each symbol.

The total symbol error rate will be:

$$ptot(e(s)) = erfc\left[\sqrt{0.5\frac{E_s}{N_0}}\sin\frac{\pi}{M}\right],$$ Eq 1 where M is the number of unique symbols in the modulation.

Due to the orthogonality of the Walsh spreading codes used, Equation 1 holds for both the 3-PSK and the 5-PSK when correlated at the receiver. A symbol error on the 3-PSK will not necessarily result in an error rate in the 5-PSK.

The total symbol error rate for standard M-PSK will be:

$$ptot(e(s)) = erfc\left[\sqrt{0.5\frac{E_s}{N_0}s\left(1-\frac{bias}{2}\right)}\sin\frac{\pi}{3}\right] + \qquad \text{Eq 2}$$

$$erfc\left[\sqrt{0.5\frac{E_s}{N_0}s\left(1-\frac{bias}{2}\right)}\sin\frac{\pi}{5}\right].$$

It can therefore be observed from equation 2 that the symbol power is divided by two for each code and then adjusted with a power bias with more power allocated to the 5-PSK.

To convert from energy per symbol to energy per bit the following formula is used:

$$\frac{E_b}{N_0} = \frac{E_s}{N_0} = -10\log_{10}k, \qquad \text{Eq 3}$$

where $k=\log_2 M$.

To convert from symbol error rate to bit error rate the modulation is assumed to be approximately GRAY coded, so that one symbol error does not result in k bit errors, so that:

$$ptot(e(b)) = ptot(e(s)) \cdot 1/k \qquad \text{Eq 4}$$

Figure 6:
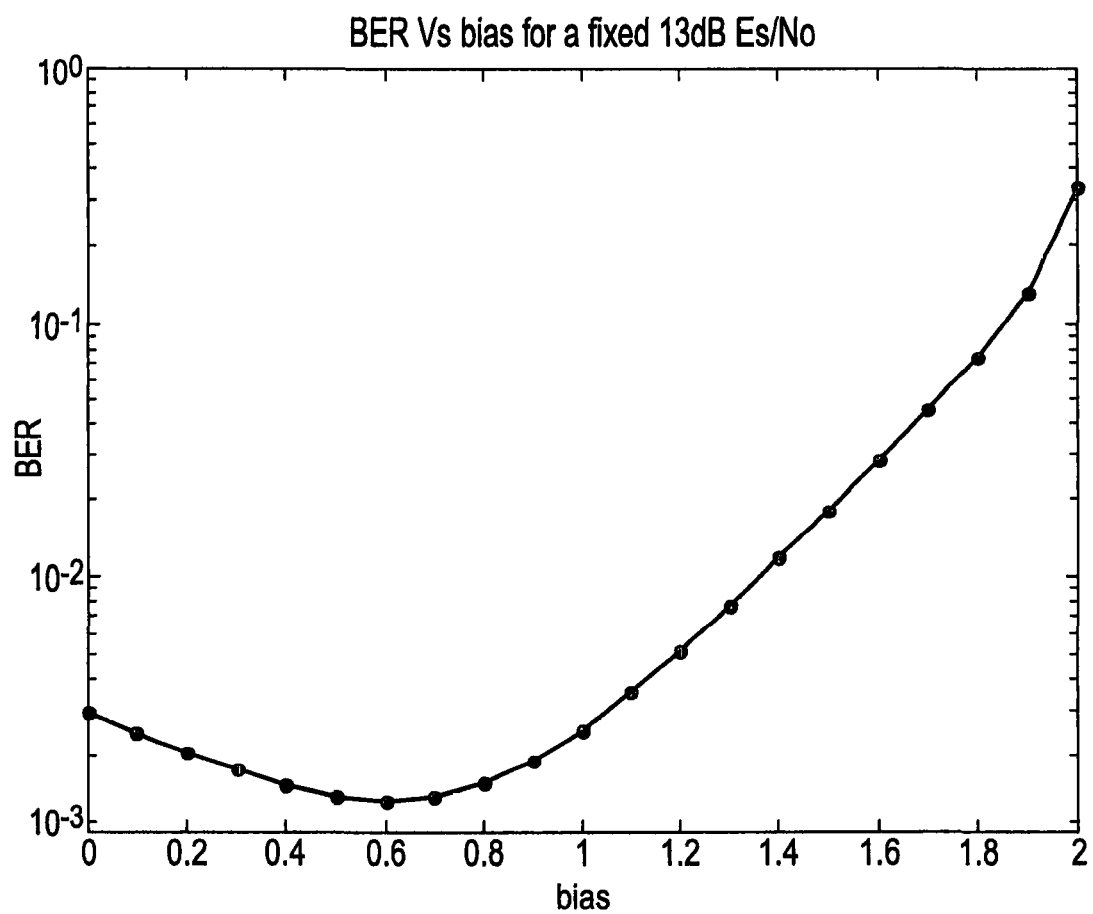
FIG. 6 shows a modelled bias curve to obtain the optimum gain.

When $E_s/N_O$ ratio is fixed and the bias value swept then an optimum linear value of 1.6 is determined through simulation as shown in FIG. 6 (therefore the gain block must be set to a linear value of 1.6 to provide the optimum BER performance).

Figure 7:
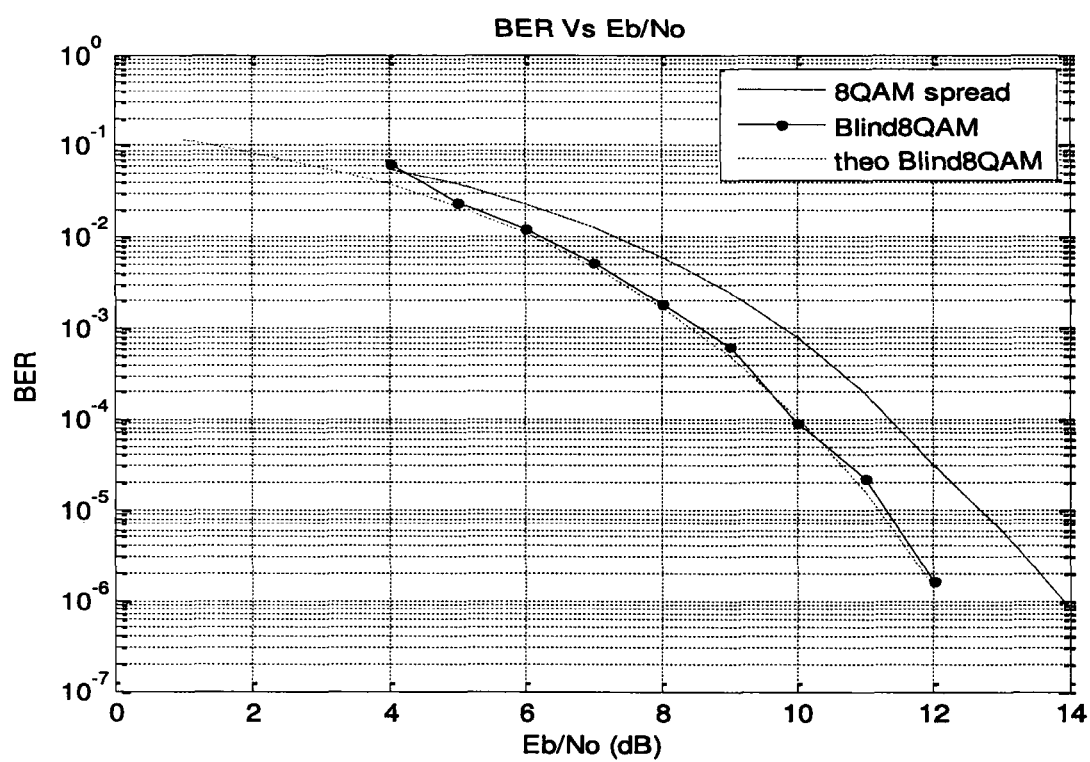
FIG. 7 shows a graph of theoretical BER curves for the odd-odd 8-PSK blind system.

It is shown in FIG. 7 that the new blind 8-QAM method outperforms the spread 8-QAM by approximately 1.3 dB at $10^{-5}$ BER. To obtain this result the value was 1.6 for the 5-PSK and 1.0 for the 3-PSK, therefore the bias value was 0.6.

Whilst the example for the 8-QAM shows an improvement in performance, as well as having the desirable characteristic of no pilot signal being required, it is necessary to consider the technique on a 16-QAM system which is more commonly used in the communications industry.

In a further embodiment of the invention the device provides an overall modulation of 16-Quadrature Amplitude Modulation.

One symbol is now derived from four bits i.e. [b0, b1, b2, b3]. b0 to b2 map the same as described above for the 8-blind-QAM, however b3 sets a new magnitude and phase rotation such that the crest factor can be minimised and the optimum constellation diagram decision boundaries can be maintained.

The demodulator determines the symbol by jointly measuring the phase and magnitude of the signal, which is important due to the need for two layers for the IQ constellation.

Therefore, the mappings for the first 3 bits of the symbol are kept the same as for 8 blind QAM, but in this embodiment there is added a 4th bit which sets a larger magnitude and an additional phase rotation of 60 degrees for the 6-QAM case and 36 degrees for the 10-QAM case, resulting in the symmetry of the IQ constellation to be removed. This means that there is asymmetry between the real and imaginary symbols whereby the average energy per symbol must be calculated separately and summed.

The same set up as per FIG. 1, FIG. 3a and FIG. 5 are applied to this 16-QAM system, but in this instance the first mapping module performs a mapping of the source data onto a 6-QAM scheme and the second mapping module performs a mapping of the source data onto a 10-QAM scheme. Note that neither of these modulation orders are odd, so this is not an essential requirement of the technique, but note that the combined modulation effect is of a 16-QAM system and therefore still satisfies the $2^N$ requirement for a digital system that was mentioned above.

Figure 8:
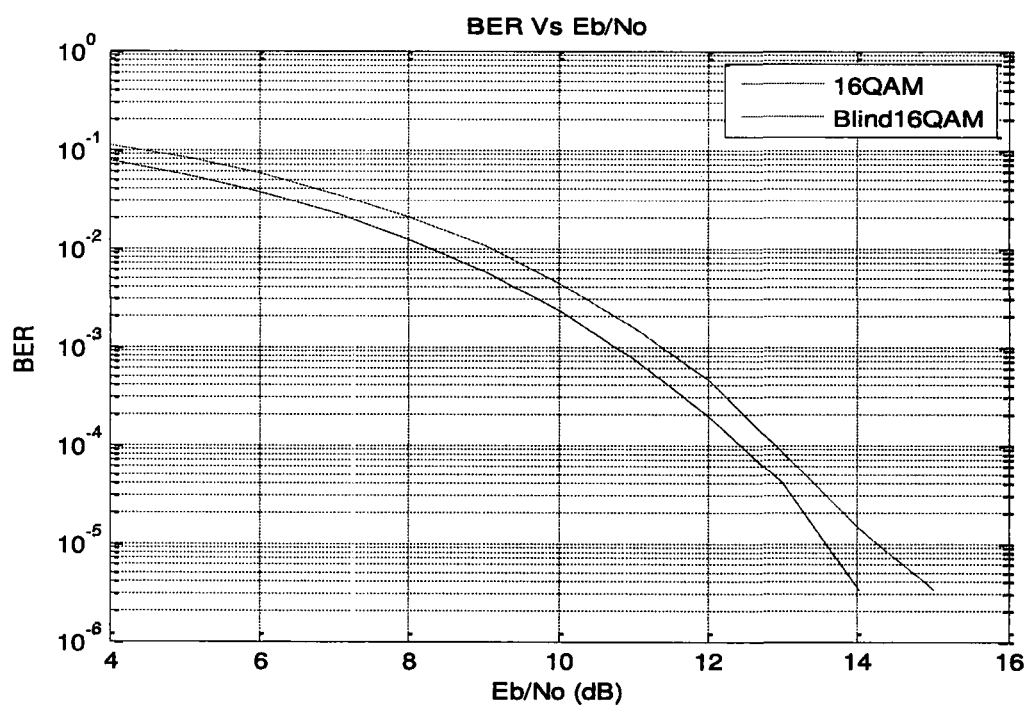
FIG. 8 shows a graph of theoretical BER curves for the 16-QAM blind system.

FIG. 8 shows that the performance of blind 16-QAM is approximately 0.1 dB worse than 16-QAM. This is for a system with 24000 symbols and a spreading factor of 2. This is because the constellations form a multi-level constellation structure so as to increase phase angles and to maximise decision boundaries. However, this constellation structure is utilised at the expense of the average power to peak power value, therefore the signal to noise benefits become equivalent, or slightly worse when compared to the standard 16-QAM case.

Whilst the BER performance advantage of the 8-QAM system is not maintained when the method is extended to 16 symbols, use of this technique still has an advantage over 16-QAM due to its blind, unaided capability and improved spectral efficiency.

Figure 9:
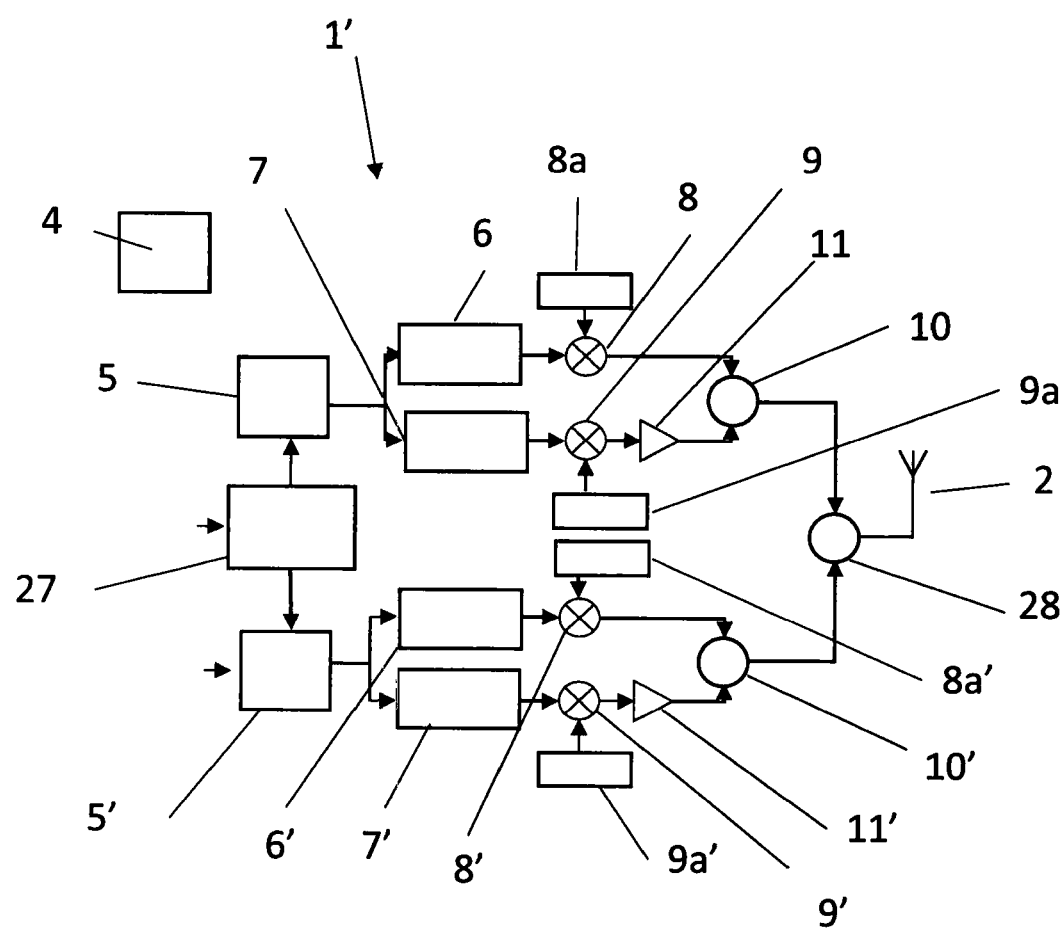
FIG. 9 shows a schematic of a multicarrier solution for the transmitter end.
Figure 10:
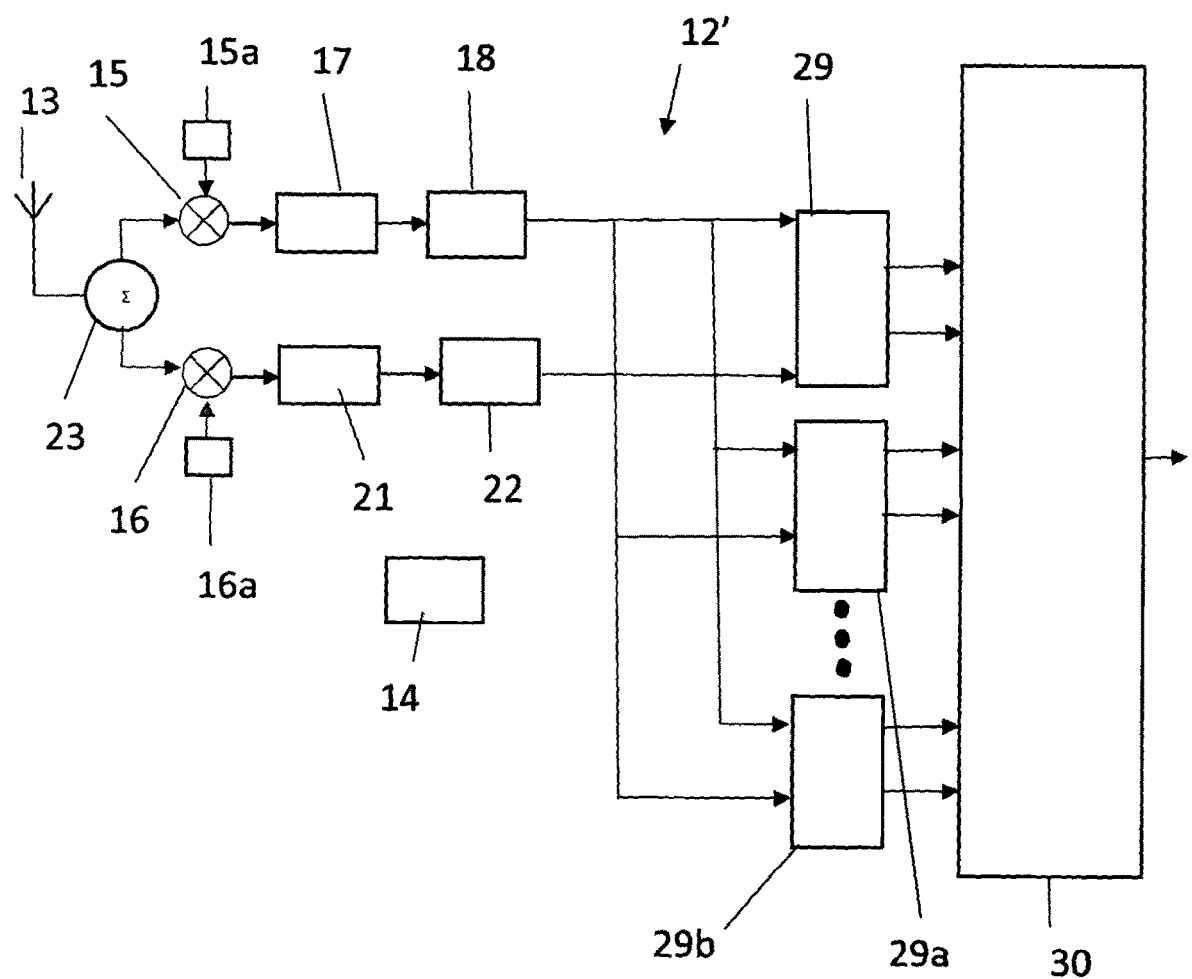
FIG. 10 shows a schematic of a multiple LUT demodulator solution for the receiver end of the communications arrangement.

FIGS. 9 and 10 demonstrate how the technique can also be applied as a multicarrier system.

FIG. 9 shows the multi-carrier solution with two sub carriers at the transmitter end 1', whereby the information to be transmitted is provided as bits and a demultiplexer 27 takes the input line of bits and routes it to two outputs. Taking the first output of the demultiplexer 27, the bits are converted to symbols by a converter 5 and are subsequently mapped onto two separate odd modulation schemes i.e. the 3-PSK and 5-PSK via a first modulation module 6 and a second modulation module 7 respectively. The signals are spread by a code spreading function module 8, 9 using orthogonal direct sequence spreading codes which are time aligned. The spreading codes 1 and 0 are provided by a first code source 8a and a second code source 9a respectively. Once spread the signals are summed together by a summing module 10 with slightly more of the signal power allocated to the higher order modulation scheme e.g. the 5-PSK scheme. This is achieved by applying a gain by means of a gain amplifier 11 located in the processor pathway intermediate the spreading function module 9 in the 5-PSK processing arm and the summing module 10.

Once summed together the modulated signal along the first route (comprising the summed 3-PSK and 5-PSK symbols) are forwarded to a frequency up converter (not shown), whereby the frequency is converted to f1 i.e. the desired first carrier frequency.

Next, considering the second output from the demultiplexer 27 the bits are then converted to symbols at the converter 5' and are subsequently mapped onto two separate odd modulation schemes i.e. the 3-PSK and 5-PSK by a first modulation scheme module 6' and a second modulation scheme module 7' respectively. The signals are spread by a first spreading function module 8' and a second spreading function module 9' using orthogonal direct sequence spreading codes which are time aligned. The spreading codes 1 and 0 are provided by a first code source 8a' and a second code source 9a' respectively. Once spread the signals are summed together by a summing module 10' with slightly more of the signal power being allocated to the higher order modulation scheme e.g. the 5-PSK signal. This is achieved by applying a gain by means of a gain amplifier 11' located in the second processor pathway intermediate the spreading function module 9' in the 5-PSK processing arm and the summing module 10'.

Once summed together the modulated signal passing along the second route (comprising the summed 3-PSK and 5-PSK symbols) is forwarded to a frequency up converter (not shown), whereby the frequency is converted to f2. Notably the f1 and f2 are two separate and distinct frequencies. The modulated signal along the first route and the modulated signal along the second route are summed at a summing module 28 and forwarded to a transmitter 2 where the final modulated signal at frequencies f1 and f2 are transmitted along a communications channel. Therefore, the same basic method steps of the single carrier method are applied, but the modulated signal is transferred across parallel subcarriers simultaneously.

FIG. 10 shows a multiple LUT demodulator solution 12' which provides good performance over all receive angles. The signal is received by the antenna 13 and is split at the summing module 23 into a first and second frequency component giving two processing routes. Taking the first route, the signal is de-spread using the de-spreading function module 15, with the de-spreading function being provided by the de-spreading function source 15a. Next the de-spread signal is integrated by the integrator 17 and then the Arc tan 2 of the signal is obtained at the Arc tan 2 circuit 18 providing a symbol output. This output is forwarded to 1 to n LUT's 29, 29a, 29b which have been adjusted for an optimised demodulation process i.e. each LUT 29, 29a, 29b is set to 360/n angles. This ensures that each LUT measures the quality of the fit of the input angles. The same process is carried out along the second route whereby the signal is de-spread using the de-spreading function module 16, with the de-spreading function being provided by the de-spreading function source 16a. Next the de-spread signal is integrated by the integrator 21 and then the Arc tan of the signal is obtained at the Arc tan 2 circuit 22 providing a symbol output. This output is forwarded to 1 to n LUT's 29, 29a, 29b which have been adjusted for an optimised demodulation process i.e. each LUT 29, 29a, 29b is set to 360/n angles.

The final circuit 30 evaluates all of the fit values from the n LUT's and then selects the symbol stream from that LUT as the output data stream.

Beneficially, no data aiding or dedicated pilot spreading codes are required to rapidly de-rotate the received signal and to estimate the received symbol, thereby offering a modulation solution that maximises on signal information space for both single carrier and multicarrier operation of FIG. 10. The BER performance is comparable with M-QAM and is scalable to a high number of bits per symbol.

Once demodulated an estimate of the channel can be achieved and so is applicable to efficient MIMO and receiver diversity systems. Therefore, this technique is believed to be a good alternative to the widely used pilot aided OFDM.

In an alternative embodiment of the invention there is provided a three bits per symbol system, but this time the symbol is time mapped onto an even and odd scheme. This embodiment also comprises the important requirement that the angular difference for the resultant mapped symbol is unique within the whole symbol set. Only then can the receiver determine the most likely transmitted symbol for an arbitrary channel phase.

The Symbol mapping for this three bits per symbol scheme is shown in Table 2.

TABLE 2

| Symbol | 3-PSK angle (degrees) | QPSK angle (degrees) | QPSK – 3-PSK differential angle (degrees) |
| --- | --- | --- | --- |
| 0 | 0 | 0 | 0 |
| 1 | 120 | 0 | 120 |
| 2 | 240 | 0 | 240 |
| 3 | 240 | 90 | 150 |
| 4 | 0 | 270 | −270 |
| 5 | 0 | 180 | −180 |
| 6 | 120 | 180 | −60 |
| 7 | 0 | 90 | −90 |

Table 2 shows that the phase difference between the odd 3-PSK and the QPSK provides the required unique angle to provide the blind properties of the modulation scheme. The mapping is designed to give the maximum phase difference between symbols and only one bit difference between the angular difference for the 3-PSK and QPSK i.e. it is Gray coded. The maximum phase difference between symbols can be simply evaluated by calculating the standard deviation of the different angles. Table 2 is not a unique solution and optimum solutions may exist.

Figure 11:
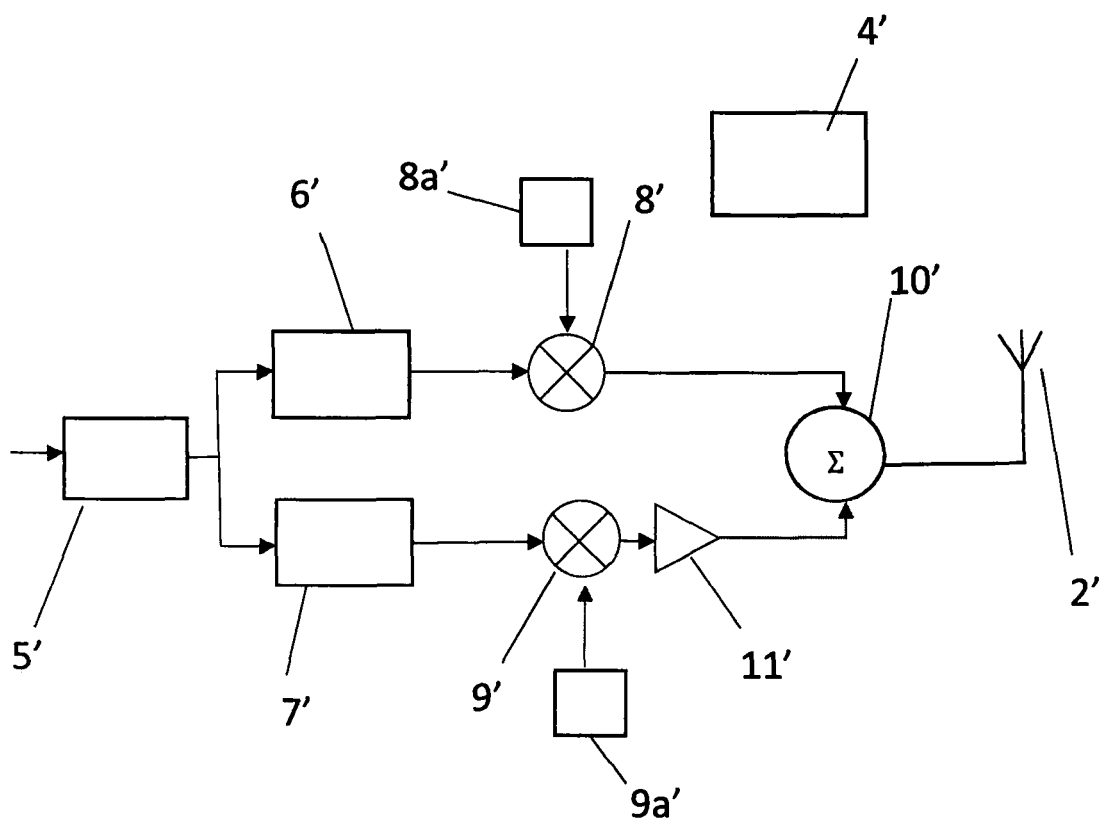
FIG. 11 shows a schematic of the transmitter end of a communications device according to the invention.

FIG. 11 shows that the transmitter end 1' there is obtained discrete source data having a signal power of a known value or given value which is unknown i.e. the signal power can be said to be predetermined.

A 3-PSK is applied via a first modulation module 6' and the QPSK is applied at a second modulation module 7' respectively The 8 symbols are mapped onto the odd and even modulated complex values i.e. the 3-PSK and QPSK schemes which are spread by using orthogonal direct sequence spreading codes for example Walsh codes generated by respective code generators 8', 9'. Therefore, the two pathways are produced by multiplication by the known orthogonal spreading codes which are correctly time aligned (provided by spreading function module 8' and spreading function module 9' each located on differing processing paths and the codes are provided by respective spreading code sources 8a', 9a').

Both odd and even PSK are spread using a direct sequence Binary Phase Shift Keying (BPSK) spreading codes and WALSH codes are used with a spreading factor (SF) of 2. The codes used are, {1 1} for the 4-PSK and {1 −1} for the 3-PSK. Once spread the signals are summed using summing module 10' with slightly more power allocated to the QPSK signal and less to the 3-PSK signal. A bias value of 1.2 is used. This bias in the power is achieved by applying a gain by means of a gain amplifier 11' located in the second processing pathway at a position intermediate the spreading function module 9' in the QPSK processing arm and the summing module 10'. This redistribution of the signal power effectively equalises the error of the 3-PSK and QPSK, by taking power from 3-PSK and giving it to the QPSK. This normalising effect is required since the 3-PSK has a lower BER performance than QPSK due to the angle between symbol positions (which can be represented in the IQ constellation).

Once summed together the final modulated signal comprising the summed 3-PSK and QPSK symbols is forwarded to a transmitter 2' and transmitted along a communications channel (not shown).

In use, at the transmitter the power of the signal is shared between the two codes, with a small gain bias being applied to the higher order M-PSK scheme, which in this example is the QPSK.

The peak to average power obtained through simulation was 1.875 dB.

Figure 12:
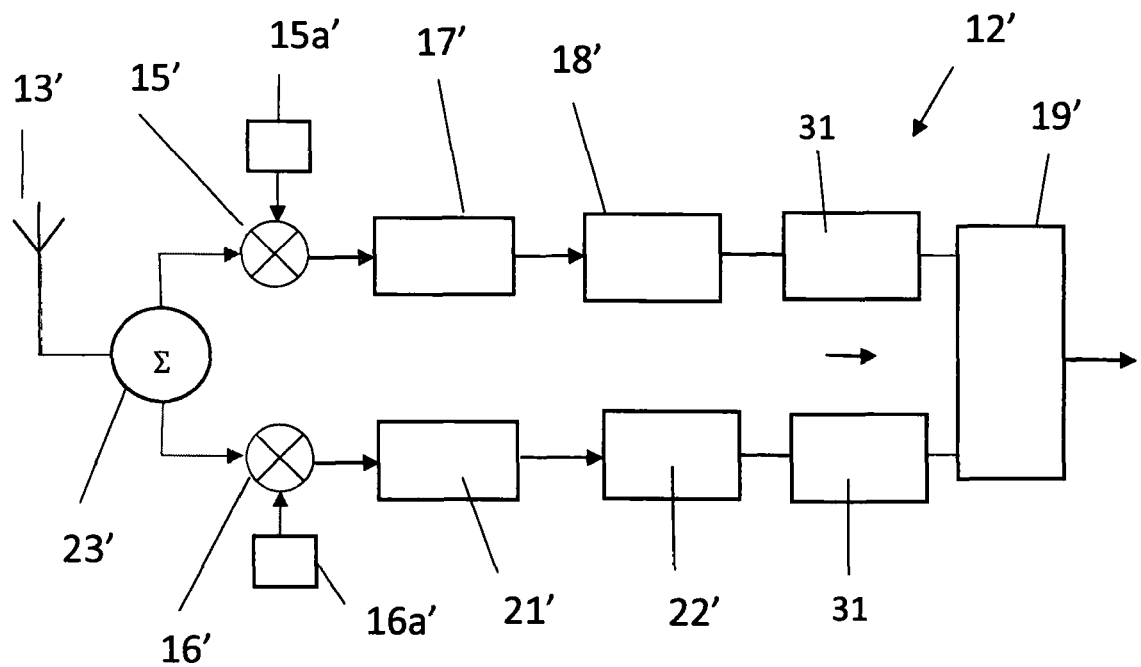
FIG. 12 shows a schematic of the receiver end of a communications device according to the invention.

In FIG. 12, the receiver correlates the two spreading codes i.e. the received signal is split into two pathways via a summing module 23' and then de-spread at the respective de-spreading function modules 15', 16' using the 0 and 1 spreading codes provided by the code source 15a', 16a'. This provided the two routes of the signal. Taking the first route, the de-spread signal is then integrated over the symbol period (i.e. from 0 second to the symbol period) at the integrator 17'. Then the Arc tan 2 of the complex value is taken at the Arc tan 2 circuit 18' to obtain the phase angle of the signal. The same process is performed along the second route using the integrator 21' and the Arc tan 2 circuit 22'. Therefore, the phase angles of the first set of symbols and the second set of symbols (i.e. the QPSK and the 3-PSK) are resolved separately in the receiver block 12'. The resultant phase angles are fed directly into a two input LUT (Look Up table) 19' where they are compared to achieve estimation of the original 8-PSK symbol. A hard angle estimate is undertaken at a function module 31 prior to forwarding of the phase angle to the LUT. Negative angle values are also corrected for at this point.

If u(t) represents the angle at the output of the a tan 2 function in degrees, then a first decision is made $$r(t) = \text{round}\left(\frac{u(t)}{\left(\frac{360}{M}\right)}\right), \quad \text{Eq 5}$$

Where M is the number of unique symbols in the modulation for example 3-PSK has M=3 and QPSK has M=4.

Following the hard angle decision the negative angle is corrected where the input to the LUT is $$z(t) = \left(\frac{360}{M}\right)(r(t) + ((r(t) < 0)M)). \quad \text{Eq 6}$$

As per the previous odd-odd example, the total symbol error rate is:

$$p\text{tot}(e(s)) = \text{erfc}\left[\sqrt{\frac{E_s}{N_0}}\sin\frac{\pi}{M}\right], \quad \text{Eq 7}$$

where M is the number of unique symbols in the modulation.

Due to the orthogonality of the Walsh spreading codes used, Equation 7 holds for both the 3-PSK and the 4-PSK when correlated at the receiver. Since the unique angular difference between symbols has been designed to be as large as possible, noise vectors act differently on each value. Therefore, a symbol error on the 3-PSK will not necessarily result in an error rate in the 4-PSK.

The total symbol error rate for standard M-PSK is:

$$p\text{tot}(e(s)) = \text{erfc}\left[\sqrt{0.5\frac{E_s}{N_0}s\left(1-\frac{bias}{2}\right)}\sin\frac{\pi}{3}\right] + \text{erfc}\left[\sqrt{0.5\frac{E_s}{N_0}\left(1-\frac{bias}{2}\right)}\sin\frac{\pi}{4}\right]. \quad \text{Eq 8}$$

It can therefore be observed from equation 6 that the symbol power is divided by two for each code and then adjusted with a power bias with more power allocated to the 4-PSK, since the angle between symbols is smaller than for the 3-PSK.

To convert from energy per symbol to energy per bit the following formula is used:

$$\frac{E_b}{N_0} = \frac{E_s}{N_0} = 10\log_{10}k, \quad \text{Eq 9}$$

where $k = \log_2 M$.

Figure 13:
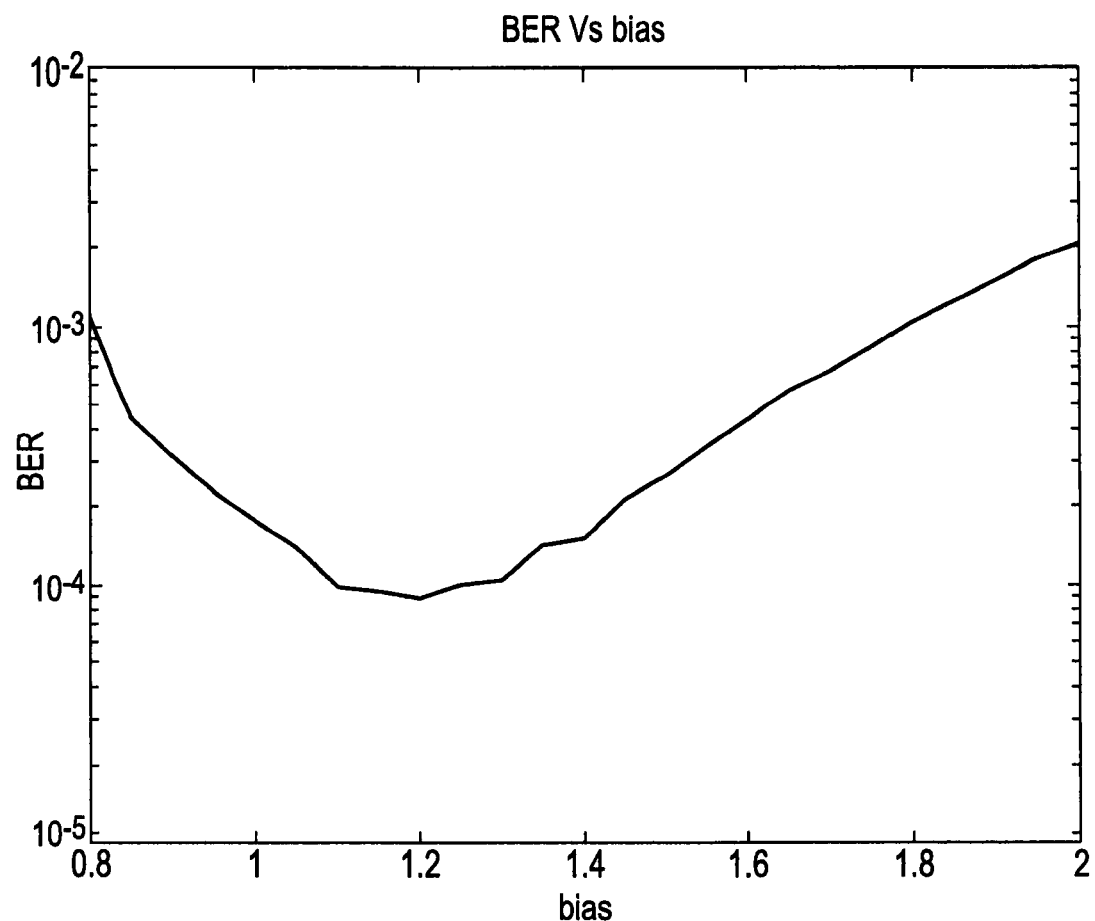
FIG. 13 shows a modelled bias curve to obtain the optimum gain for the second embodiment of the invention.

To convert from symbol error rate to bit error rate the modulation is assumed to be approximately GRAY coded, so that one symbol error does not result in k bit errors, so that:

$$p\text{tot}(e(b)) = p\text{tot}(e(s)) \cdot 1/k \quad \text{Eq 10}$$

when $E_s/N_O$ ratio is fixed and the bias value swept then an optimum linear value of 1.2 is determined through simulation as shown in FIG. 13 (therefore the gain block must be set to a linear value of 1.2 to provide the optimum BER performance).

Figure 14:
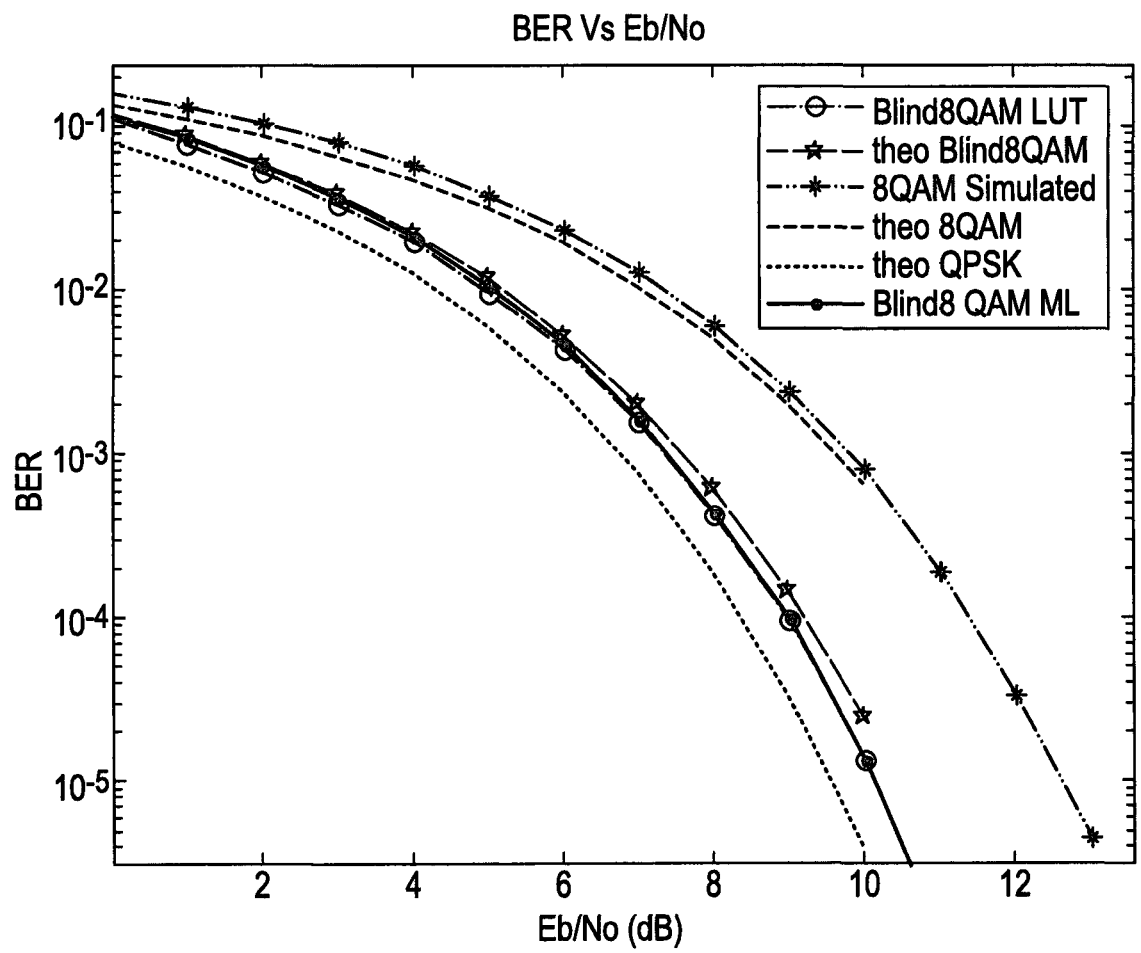
FIG. 14 shows a graph of the theoretical BER curves for the odd-even 8-PSK blind system according to a second embodiment of the invention.

It is shown in FIG. 14 that the new blind 8-QAM method outperforms the spread 8-QAM by approximately 2.3 dB at $10^{-5}$ BER.

Figure 15:
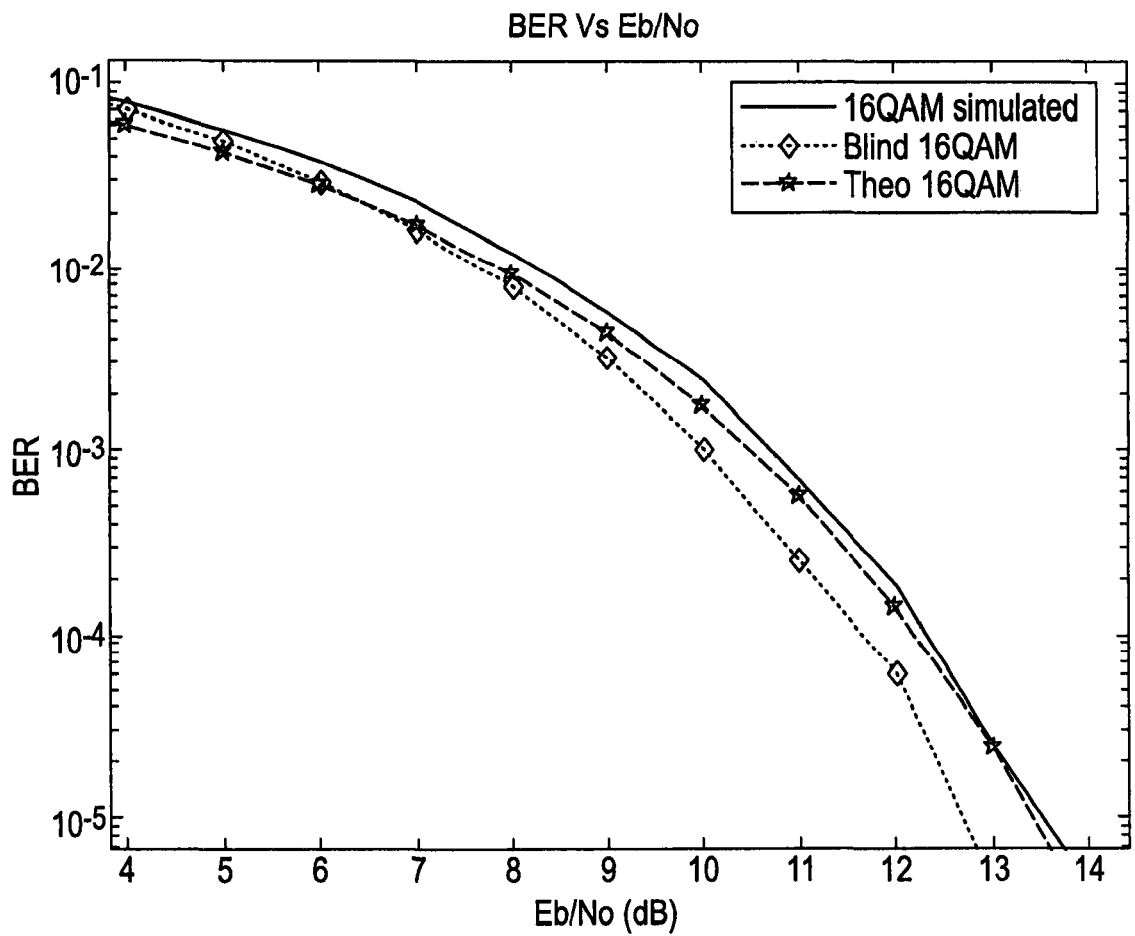
FIG. 15 shows a graph of theoretical BER curves for the odd-even 16-QAM blind system according to the second embodiment of the invention.

In a similar way to the 8 symbol version, a 16 symbol version has been constructed using the same angle mappings as given in Table 2, using the first 3 bits of a 4 bit group as the 8 symbol mapping. The fourth bit is then used to control the magnitude of both the 3-PSK and 4-PSK, so giving a 6 symbol mapping and an 8 symbol mapping. In this arrangement the peak to average power ratio was measured from simulation as 2.996 dB. In FIG. 15 it is shown that the performance of Blind16QAM is approximately 0.73 dB better than the 16 QAM theoretical calculation at the $10^{-5}$ BER value.

In a further alternative of the invention, a four symbol version has been produced with the symbol to angle mappings as shown in Table 3.

TABLE 3

| Symbol | 3-PSK angle (degrees) | BPSK angle (degrees) | BPSK – 3-PSK differential angle (degrees) |
|---|---|---|---|
| 0 | 0 | 0 | 0 |
| 1 | 120 | 0 | 120 |
| 2 | 0 | 180 | −180 |
| 3 | 240 | 180 | 60 |

Figure 16:
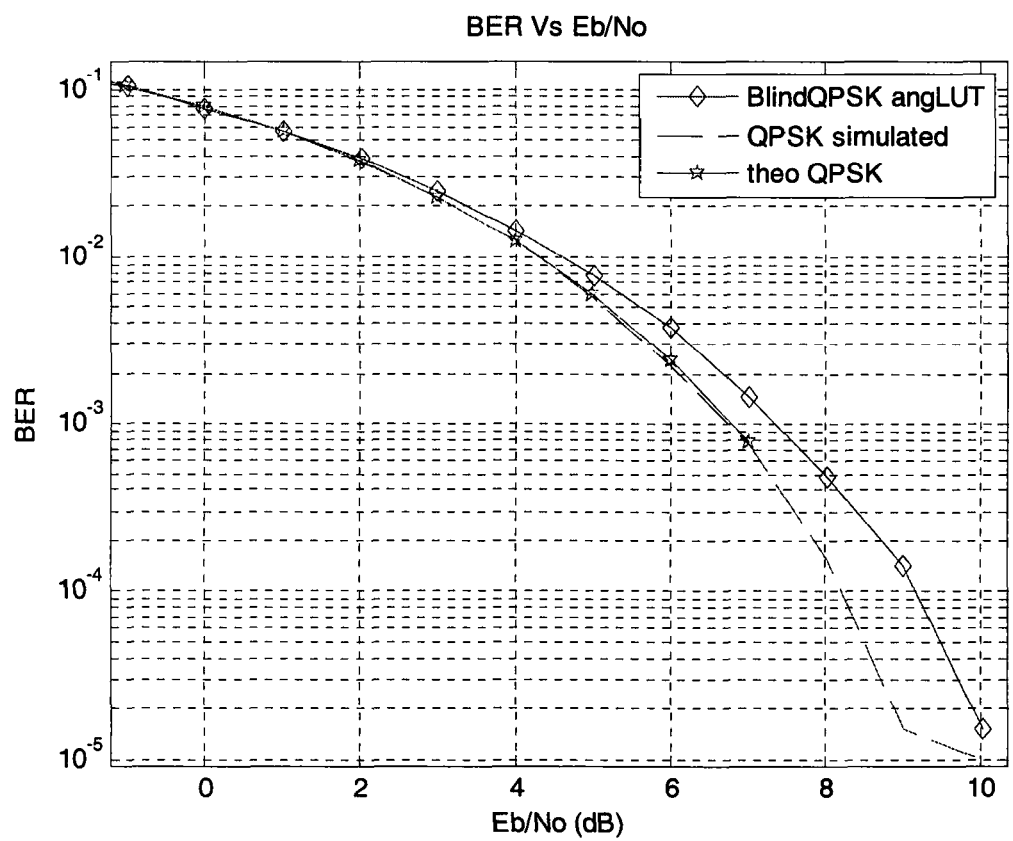
FIG. 16 shows a graph of theoretical BER curves for the odd-even Q-PSK blind system according to the third embodiment of the invention.

FIG. 16 shows the simulated peak to average power ratio to be 1.976 dB.

Various modifications to the principles described above would suggest themselves to the skilled person. For example, the communication channel may not be a wireless channel and may instead be provided via an optical fibre or other hardware means e.g. may be wired.

The two Phase Shift Keying schemes applied in the separate branches of the processor at the transmitter end need not be odd, but using schemes where the summed scheme has an order that is a power of two is understandably desirable from a computational perspective to perform efficient binary applications.

Other spreading codes may be implemented for larger spreading factors to be achieved, for example Gold codes may be applied. The embodiments of the invention use a spreading factor of 2, but values of greater than 2 are also applicable to this technique.

It is appreciated that other optimum solutions exist for the symbol mapping, for example the system also works well using a standard deviation of 187.99 which is slightly less than the Standard Deviation used in Table 1.

In an alternative aspect of the invention, a program could be produced to randomly select the mapping and trial it and measure the BER performance for a fixed signal to noise ratio or find an analytical method to find the optimum mapping of symbols to angles. This alternative approach is considered to be a 'brute force' approach to force a solution to give minimal BER.

In an alternative embodiment the predetermined signal power of the waveform can be split into more than two paths i.e. where the spreading factor is greater than two and where more orthogonal codes are available. If the spreading factor is greater than two, longer codes are used of which there are many known types and which also includes just randomly generated noise as long as they are found to be orthogonal.

In an alternative embodiment of the invention there is provided an analogue input that is sampled to provide quantised or discrete source data. The analogue input may be sampled to provide a wave form vector. The waveform may be provided (either generated by a waveform source or collected from a receiver that feeds the transmitter end) and is sampled at intervals by a sampling module to provide a waveform vector. The waveform vector is then used as the source data.

The demultiplexer need not split the input line into 2 routes and may instead split the single input into more than 2 output lines.

For reference, the terms Arc tan 2 and A TAN 2 have the same meaning and are used in computing to compute the principle value of the argument function applied to a complex number x+iy.

An alternative to the hard angle decision LUT demodulator is a conventional maximum likelihood (ML) estimator where symbol hypothesis are subtracted from the receiver vector, the most likely symbol is then identified by comparing the resultant powers and selecting the minimum $$\hat{x}=\mathrm{argmin}|y-\hat{x}|^2 \quad \text{Eq 11}$$

$\hat{x} \in \{\text{all possible values of x}\}$

The FIG. 14 BER vs Eb/No plot also shows the result for a ML demodulator.

It must be noted that in all simulations the channel was configured to be Gaussian and the static phase shift was set to zero radians, so that only one LUT in the receiver is required.

It is noted that a long spreading code would be required if Walsh codes are used. However, in alternative embodiments for larger spreading factors, other orthogonal spreading codes can be used, such as Gold codes, or codes found through a brute force process with goals set for orthogonality and code balance.

The invention claimed is:

1. A method of signal communication implemented at a transmitter end of a communications network comprising:
   providing source data having a predetermined signal power;
   mapping the source data onto a first modulation scheme to obtain a first set of complex symbols;
   mapping the source data onto at least one further modulation scheme to obtain at least one further set of complex symbols;
   spreading the first set of complex symbols and at least one further set of complex symbols by a first and second orthogonal spreading code respectively; and
   combining the first set of complex symbols and the at least one further set of complex signals to form a modulated signal to be forwarded along a communications channel, wherein the predetermined signal power of the source data is split between the first modulation scheme and the at least one further modulation scheme.

2. The method according to claim 1, wherein the source data is discrete source data.

3. The method according to claim 1, wherein the first modulation scheme is represented by a first constellation diagram and the at least one further modulation scheme is represented by at least one further constellation diagram, wherein the first modulation scheme and the at least one further modulation scheme is selected such that an angle between a selected symbol in the first constellation diagram and any symbol in the at least one further constellation diagram is unique.

4. The method according to claim 1, wherein a modulation order of the first modulation scheme differs to the modulation order of the at least one further modulation scheme.

5. The method according to claim 1, wherein the first modulation scheme and the at least one further modulation scheme is a Phase Shift Keying modulation scheme.

6. The method according to claim 5, wherein a constellation of at least one of the first modulation scheme and the at least one further modulation scheme is asymmetric.

7. The method according to claim 1, wherein a modulation order of the first modulation scheme is of an odd value and the modulation order of the at least one further modulation scheme is of an odd value.

8. The method according to claim 1, wherein a modulation order of the first modulation scheme is of an odd value and the modulation order of the at least one further modulation scheme is of an even value.

9. The method according to claim 1, wherein the first set of complex symbols and further set of complex symbols are modulated in phase and amplitude.

10. The method according to claim 1, comprising mapping the first set of complex symbols to a first angle and mapping the further complex set of symbols to a further angle.

11. The method according to claim 10, further comprising maximising a standard deviation of a differential angle between the first angle and the further angle.

12. The method according to claim 1, wherein the orthogonal spreading codes comprise a spreading factor of 2.

13. A method according to claim 1, wherein a modulation order of the first modulation scheme or the at least one further modulation scheme is an odd value.

14. A method of signal communication implemented at a receiver end of a communication network comprising:
   receiving a modulated signal comprising a first set of complex symbols and a further set of complex symbols;
   measuring a phase angle of the first set of complex symbols;
   de-spreading the first set of complex symbols and de-spreading the at least one further set of complex symbols spread by first and second orthogonal spreading codes respectively;
   measuring the phase angle of the further set of complex symbols; and determining source data in dependence upon the phase angle of the first set of complex symbols and the phase angle of the further set of complex symbols.

15. The method according to claim 14 further comprising determining an angular difference between the first set of complex symbols and the further set of complex symbols and subsequently determining the source data in dependence upon the angular difference.

16. A communications device comprising a transmitter, processor and a memory, wherein the memory stores instructions that, when executed cause the processor to:
provide source data having a predetermined signal power;
map the source data onto a first modulation scheme to obtain a first set of complex symbols;
map the source data onto at least one further modulation scheme to obtain at least one further set of complex symbols; and
combine the first set of complex symbols and the at least one further set of complex signals to form a modulated signal to be forwarded along a communications channel; wherein the predetermined signal power of the source data is split between the first modulation scheme and the at least one further modulation scheme, the communications device further comprising:
a first code generator and at least one further code generator, the first code generator and at least one further code generator for generating and applying orthogonal spreading functions to the first set of complex signals and at least one further complex symbols prior to the combining.

17. The communications device according to claim 16 further comprising a gain module for allocating more of the predetermined signal power of the source data to the first modulation scheme compared to the at least one further modulation scheme.

* * * * *

UNITED STATES PATENT AND TRADEMARK OFFICE
CERTIFICATE OF CORRECTION

| | |
|---|---|
| PATENT NO. | : 11,477,063 B2 |
| APPLICATION NO. | : 17/291245 |
| DATED | : October 18, 2022 |
| INVENTOR(S) | : Nigel James Tolson |

It is certified that error appears in the above-identified patent and that said Letters Patent is hereby corrected as shown below:

In the Claims

Column 16, Line 6, Claim 1, replace "signal to he forwarded along a communication chan-" with
-- signal to be forwarded along a communication chan- --.

Signed and Sealed this
Eighteenth Day of April, 2023

Katherine Kelly Vidal
*Director of the United States Patent and Trademark Office*